W. J. McDOUGAL.
VEHICLE BRAKE.
APPLICATION FILED MAR. 18, 1912.
1,073,266.
Patented Sept. 16, 1913.
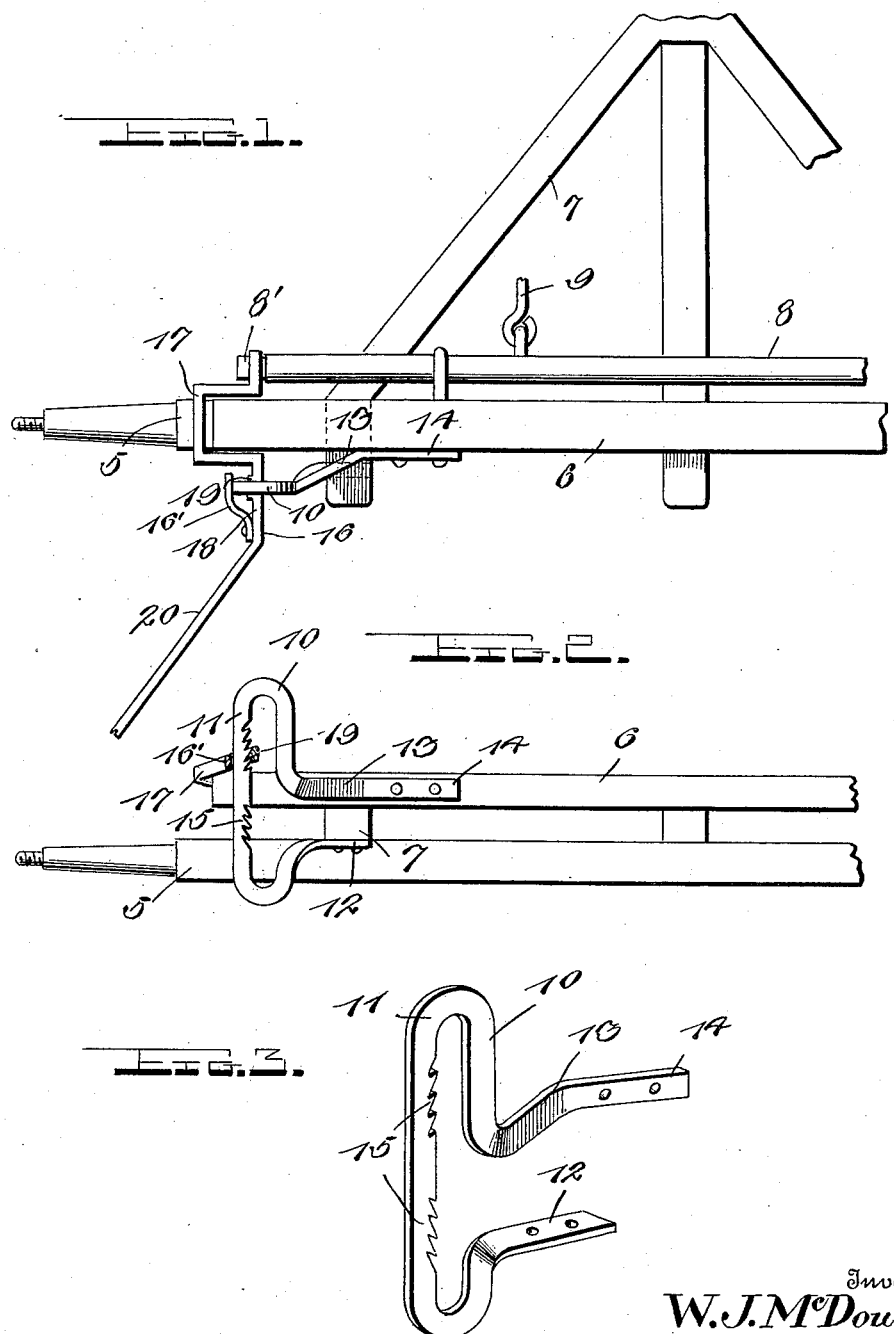
Witnesses
Chas. L. Grieshauer.
A. B. Norton.
Inventor
W. J. McDougal,
By Watson E. Coleman.
Attorney
COLUMBIA PLANOGRAPH CO., WASHINGTON, D. C.

UNITED STATES PATENT OFFICE.

WILLIAM J. McDOUGAL, OF RISING SUN, MARYLAND.

VEHICLE-BRAKE.

1,073,266.  Specification of Letters Patent.  Patented Sept. 16, 1913.

Application filed March 18, 1912. Serial No. 684,594.

*To all whom it may concern:*

Be it known that I, WILLIAM J. McDOUGAL, a citizen of the United States, residing at Rising Sun, in the county of Cecil and State of Maryland, have invented certain new and useful Improvements in Vehicle-Brakes, of which the following is a specification, reference being had to the accompanying drawings.

This invention relates to improvements in vehicle brakes and more particularly to an improved brake actuating lever and rack, the invention having for its primary object the provision of a simple, durable and efficient device of this character, the parts of which are so mounted and arranged that the brakes may be easily and quickly operated with a minimum of exertion to apply or release the same.

With the above and other objects in view, the invention consists of the novel features of construction, combination and arrangement of parts hereinafter fully described and claimed, and illustrated in the accompanying drawings, in which—

Figure 1 is a top plan view of a vehicle axle and bolster and a portion of the reach frame showing my improved brake lever and rack mounted in position thereon; Fig. 2 is a rear elevation; and Fig. 3 is a detail perspective view of the rack.

Referring in detail to the drawing 5 designates the rear axle of a vehicle which is provided upon its ends with the usual wheel carrying spindles. Above this axle the transverse bolster 6 is arranged and the ends of the hounds 7 of the reach frame extend between the axle and bolster and are secured in position in any approved manner. Arranged in advance of the bolster 6 and rotatably supported thereon is the transverse rod 8 which is connected by means of the longitudinally extending rods 9 to the transverse brake beam (not shown).

The rack which constitutes part of the subject matter of the present invention is generally designated by the numeral 10 and consists of a single metal bar bent intermediate of its ends to provide an elongated loop 11 which is open on one side, the ends of the bar being laterally extended. One end of this rack bar indicated at 12 is disposed upon the under side of the rear end of one of the hounds 7 and is rigidly fixed thereto by means of bolts or similar fastening devices. The other end portion of the rack bar is extended forwardly at an inclination to the loop 11 as shown at 13, and its extreme end portion is disposed in parallel relation upon the rear face of the bolster 6 as indicated at 14 to which it is also rigidly secured by suitable bolts as shown. The intermediate portion of the bar 10 which forms one side of the loop 11 is provided upon its inner edge and upon opposite sides of its center with the oppositely inclined series of teeth 15, the purpose of which will be apparent from the following description. The brake actuating lever shown at 16 is provided adjacent to one of its ends with a laterally extending rectangular loop 17 within which the end of the bolster 6 is received. The extremity of the lever is extended forwardly from this loop and provided with a rectangular opening to receive the square end 8' of the rotatable rod 8. The actuating lever is also formed with a longitudinally and rearwardly extending portion 18 which is disposed for vertical movement in the loop 11 of the rack and upon this longitudinal portion of the lever a lug or tooth 19 is formed to engage with the spaced series of teeth 15 upon the intermediate portion of the rack bar. The actuating lever carries a spring 16' which bears at its free end against one edge of the rack and normally acts to hold the tooth 19 of the lever in engagement with the teeth on the rack bar. From the longitudinal portion 16 of the lever the same is extended rearwardly and outwardly at an angle as shown at 20 to provide a suitable handle whereby said lever may be moved.

In actual use, when it is desired to set the brakes against the vehicle wheels, the operator disengages the lug or tooth 19 of the lever from the lower series of teeth 15 of the rack bar and forces the same upwardly in the loop 11. In this upward movement of the lever, the rod 8 is rotated whereby the connecting rods 9 are drawn rearwardly and the brake beam moved upon the reach frame to cause the blocks or shoes on the ends thereof to frictionally engage the vehicle wheels. When sufficient pressure of the shoes upon the wheels has been obtained, the actuating lever is released whereupon the spring 16' acts to force the lug 19 of the lever in the upper series of teeth 15 of the rack bar whereby said lever is securely held against downward movement and the brakes retained in their applied positions. The reverse of this movement of the lever will of course, release the brakes. It is understood that the forward end of the lever is capable of a slight rocking movement upon the end of the rod 8 so as to permit of the disengagement of the clutch or holding tooth of the lever from the teeth of the rack bar.

From the foregoing it is believed that the construction and manner of mounting the several parts of the invention will be clearly understood.

By means of my improved brake lever and rack constructed and applied in the manner above described, the brakes may be easily and quickly applied or released without requiring a great amount of labor upon the part of the operator. As the elements employed are of extremely simple form, it will be obvious that the same as a whole is extremely strong and durable in construction and may be produced at comparatively small cost.

While I have shown and described the preferred construction and arrangement of the various parts, the invention is susceptible of considerable modification without departing from the essential feature or sacrificing any of the advantages thereof.

Having thus described the invention what is claimed is:—

In combination with the axle of a vehicle, a transverse bolster arranged above and spaced from said axle and hounds having their ends arranged between said axle and bolster, of a transverse rod arranged in spaced relation with the bolster, a brake actuating lever secured to one end of said rod, said lever having adjacent its end a rectangular loop to receive the end of the bolster, and a metal bar bent to provide an elongated loop, having one end secured to the bolster and the other end secured to the end of one of the hounds, the intermediate portion of said loop being provided upon its inner edge and adjacent the ends thereof with teeth, said brake lever being movable in said loop and having a tooth for engagement with the teeth on the loop, and a leaf spring fixed at one of its ends to said lever, the free end of said spring being movable upon the outer untoothed edge of the loop and normally exerting pressure against the same to hold the tooth on the lever into engagement with the teeth on the loop.

In testimony whereof I hereunto affix my signature in the presence of two witnesses.

WILLIAM J. McDOUGAL.

Witnesses:
MONA J. BUCK,
GRANVILLE C. McDOUGAL.

Copies of this patent may be obtained for five cents each, by addressing the "Commissioner of Patents, Washington, D. C."